June 23, 1953
L. R. BESTER
2,642,852
ADDED AIR CHARGE AND WATER INJECTION SYSTEM
Filed Feb. 28, 1949
3 Sheets-Sheet 1
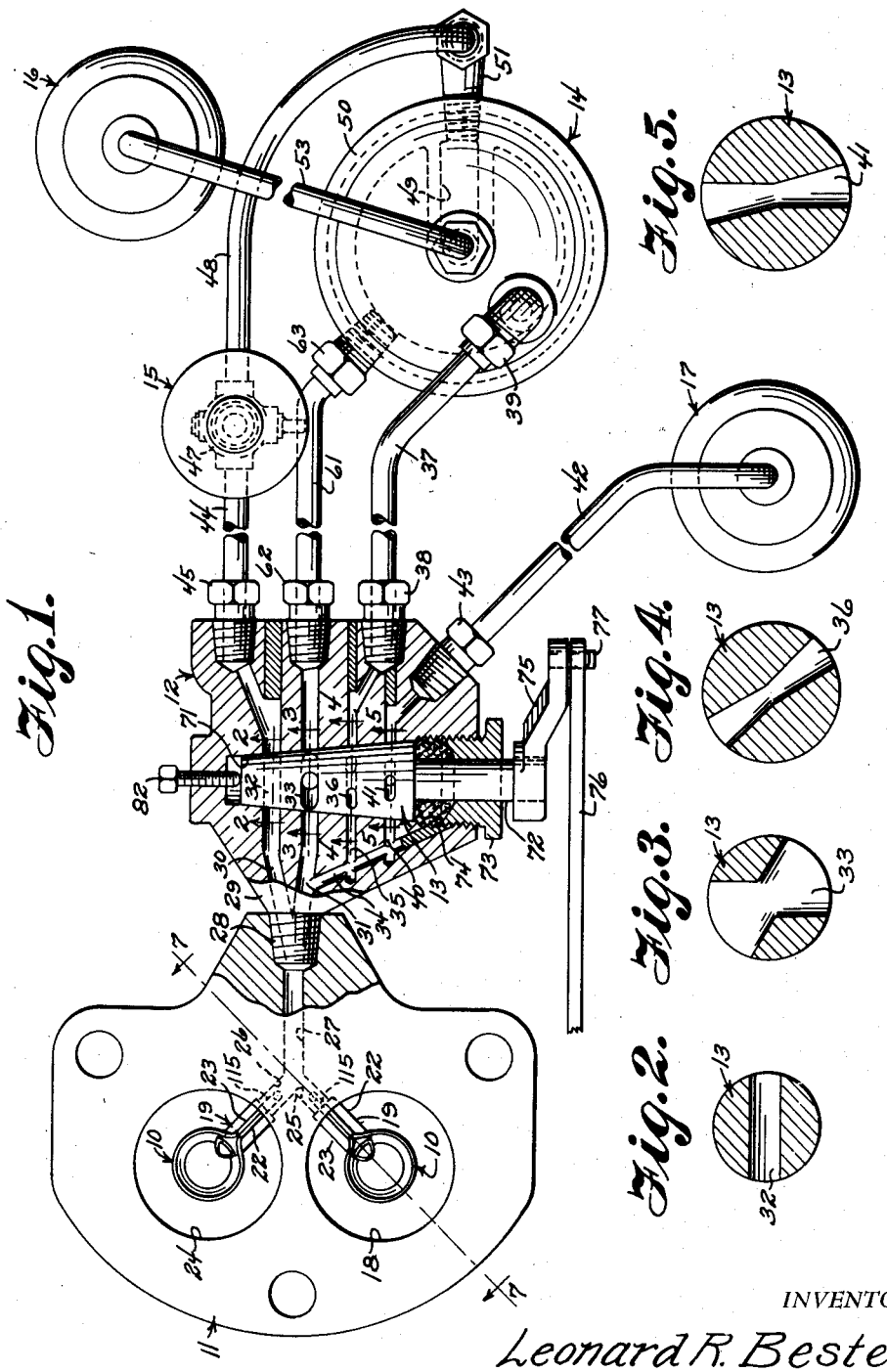
INVENTOR.
Leonard R. Bester
BY Victor J. Evans & Co.
ATTORNEYS

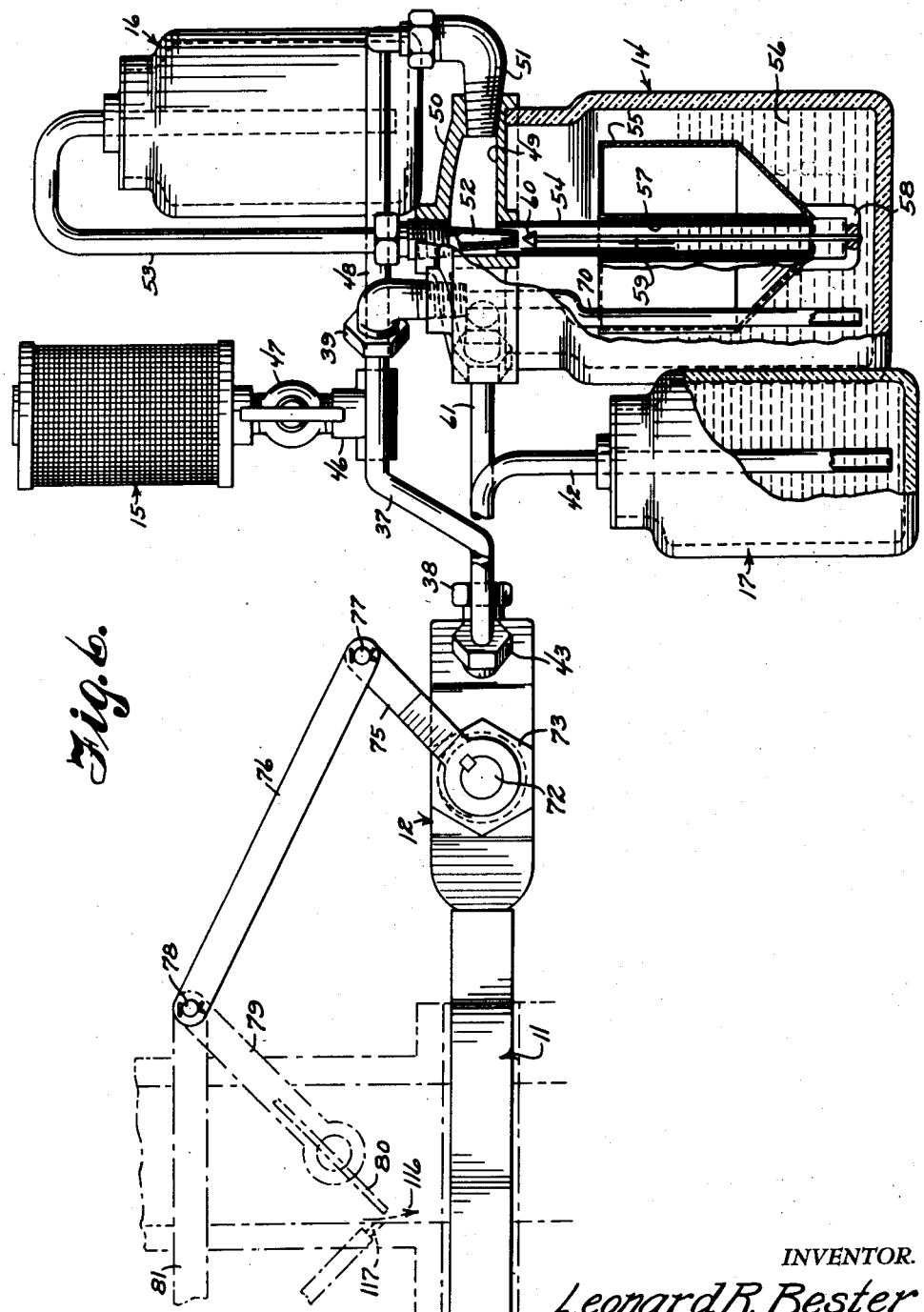

June 23, 1953 L. R. BESTER 2,642,852
ADDED AIR CHARGE AND WATER INJECTION SYSTEM
Filed Feb. 28, 1949 3 Sheets-Sheet 3
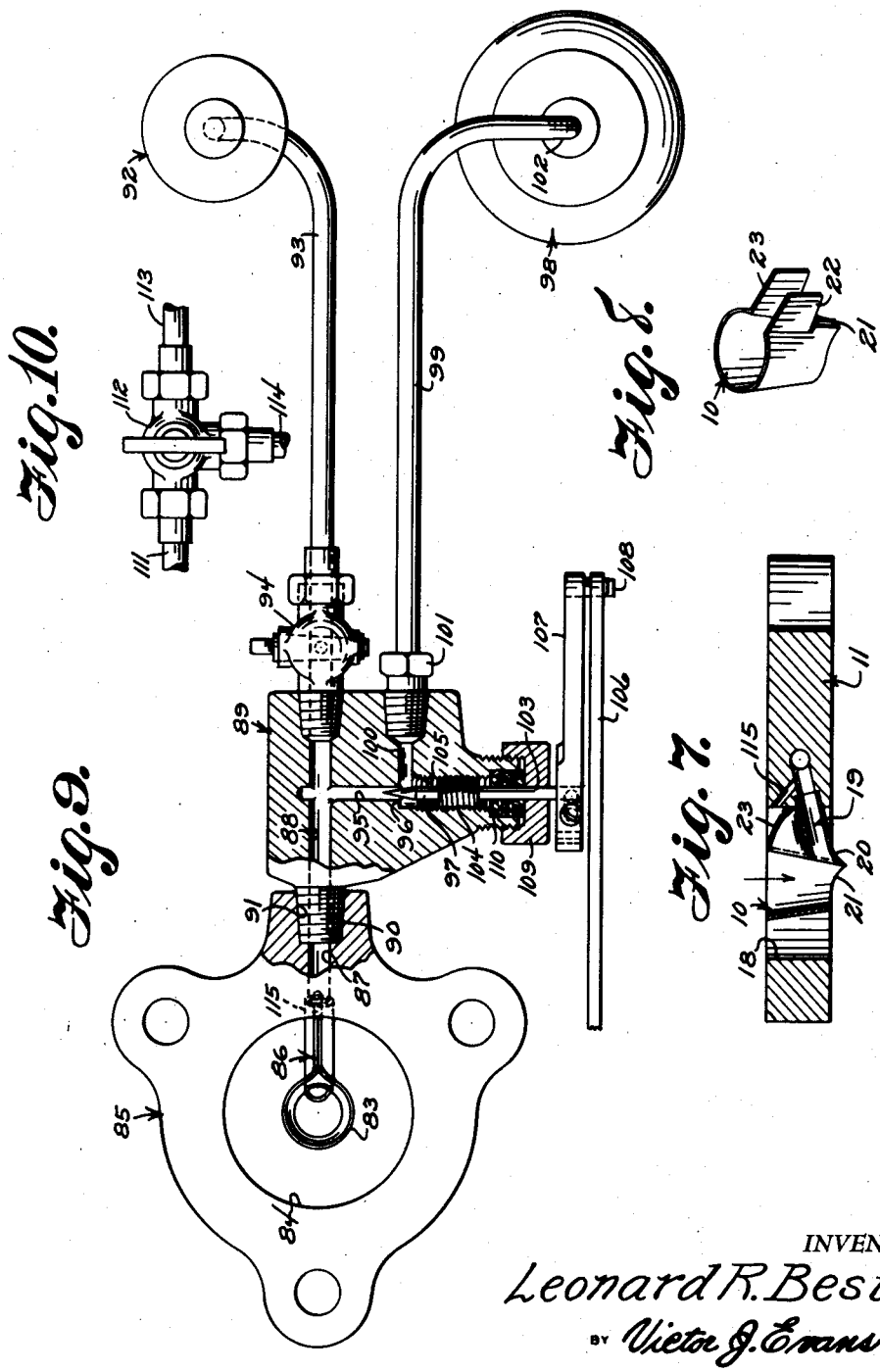
INVENTOR.
Leonard R. Bester
BY Victor J. Evans & Co.
ATTORNEYS Patented June 23, 1953

2,642,852

UNITED STATES PATENT OFFICE 2,642,852

ADDED AIR CHARGE AND WATER INJECTION SYSTEM

Leonard R. Bester, Washington, D. C.

Application February 28, 1949, Serial No. 78,711

9 Claims. (Cl. 123—25)

This invention relates to auxiliary fuel and water injection devices of internal combustion engines, and in particular includes means for providing suction at high speeds and with the throttle in the full open position whereby dry air only is provided with the engine idling, moist air is added as the speed increases, and as the speed is still further increased water, and then additional fuel are added to the mixture entering the intake manifold.

The purpose of this invention is to increase the efficiency of internal combustion engines by providing moisture with the fuel and wherein the added moisture is in proportion to the speed and load of the engine.

Various attempts have been made to increase the moisture content of the fuel of internal combustion engines wherein water has been sprayed and dropped into the fuel stream but these rely upon the vacuum force of the intake manifold and this force is greater with the engine idling whereas the moisture content should be increased with the increasing speed of the engine. With this thought in mind this invention contemplates auxiliary means for providing increased suction for drawing moisture into the fuel of internal combustion engines wherein the suction increases with the speed of the engine.

The object of this invention is, therefore, to provide a device having an independent suction action that is adapted to be inserted in the connection between the carburetor and the carburetor flange of an intake manifold which provides a suction force that increases with the speed of an engine so that supercharging humidifying and extra fuel instrumentalities may be actuated thereby to supply dry air at idling speed, moist air at intermediate speeds, and water and extra fuel at increasing speed.

Another object of the invention is to provide a humidifying and supercharging device for internal combustion engines that may be installed on engines now in use without changing the parts thereof.

Another object of the invention is to provide means for supplying moisture to fuel of internal combustion engines with the moisture added in proportion to the speed of the engine and with the moisture also controlled by the foot throttle of the engine.

Still another and important object of my invention is to provide means which will function so as to produce results of a self-balanced proportion, whereby the liquid or detonant inhibitor injection with added air is automatically apportioned at full throttle and high speed, when there is no volumetric vacuum in the manifold, and may be varied for the full throttle and low speed and heavy load, as in uphill pull, with the coordination of forces of inner function without added mechanism.

A further object of the invention is to provide a common unit for supplying dry air, moist air, water and extra fuel to the fuel of an internal combustion engine with the suction means for drawing the products into the engine actuating with increased suction as the speed of the engine increases.

A still further object of the invention is to provide means for supplying moisture and extra or special fuel to the fuel of an internal combustion engine with the proportions thereof increasing as the speed of the engine increases which is of a comparatively simple and economical construction.

With these and other objects in view the invention embodies a valve casing with connections to supercharge air filtering, humidifying and extra fuel supplying accessories with the valve connected to the throttle valve of the carburetor of a vehicle or independently actuated in which the device is installed and with the valve communicating with the fuel passage to the intake manifold of the engine of the vehicle through an auxiliary suction device.

Other features and advantages of the invention will appear from the following description taken in connection with the drawings, wherein:

Figure 1 is a plan view with parts shown in section and part in elevation illustrating the construction of the valve member and showing the connections of the valve member to the fuel passage of the engine and to filtering humidifying and water and fuel supplying devices.

Figure 2 is a cross section through the dry air port of the valve core with the casing omitted and taken on line 2—2 of Figure 1.

Figure 3 is a similar section taken on line 3—3 of Figure 1 and showing the moist port.

Figure 4 is a similar section taken on line 4—4 of Figure 1 showing the water port through the core.

Figure 5 is also a similar section taken on line 5—5 of Figure 1 showing the extra fuel port.

Figure 6 is a side elevational view with parts broken away and shown in section illustrating the connections of the valve member to the water and extra fuel tanks and also to the supercharge air filter and humidifier.

Figure 7 is a cross section through the auxiliary suction providing device taken on line 7—7 of Figure 1.

Figure 8 is a detail illustrating the auxiliary suction providing device.

Figure 9 is an elevational view somewhat similar to that shown in Figure 1 showing a single valve carburetor with a simplified valve member wherein the valve member is provided with air and water connections only.

Figure 10 is a detail illustrating a modification wherein a three way valve is provided in the connection to the water tank of the device illustrated in Figure 9 whereby added fuel may also be provided through the water connection.

Referring now to the drawings wherein like reference characters denote corresponding parts the fuel moistening, atomizing and injecting device of this invention includes a suction element 10 provided in a flange 11 positioned between a carbuertor and an intake manifold of an internal combustion engine, a valve chamber 12 having a core 13, a humidifier 14, an air filter 15, a water tank 16 and a tank 17 for extra or special fuel.

In the usual type of internal combustion engine the vacuum force is greater with the engine idling and as the butterfly or throttle valve is open the vacuum decreases. With this thought in mind this invention provides a frustro-conical suction element 10 which is installed in an opening 18 in the flange 11 and with the element installed as illustrated in Figure 7 air passing through the opening in the direction of the arrow will enter the member 10 through the large end and the converging sides thereof will increase the velocity of the air which will provide suction through a tubular member 19 opening into the small end of the member 10. The air passing to the carburetor over the device creates suction for drawing dry and moist air, water and fuel into the carburetor. The member 19 is provided with an arcuate lip 20 that merges with point 21 of the sides of the member 10. The member 10 is provided with flanges 22 and 23 by which it is secured in the flange 11 as shown in Figure 7.

In the design shown in Figure 1 wherein the device is used with a double barrel carburetor the flange 11 is provided with an additional opening 24 and the tubular members 19 extending from the members 10 in the openings are mounted in the ends of the branches 25 and 26 of a Y opening 27 and the opening is provided with a threaded socket 28 in which the shank 29 of the valve member 12 is threaded.

With the parts arranged in this manner the opening 27 communicates with branch connections 30 and 31, the connection 30 providing a passage for dry air from the supercharger air filter 15 through the port 32 in the core 13, and the connection 31 providing a passage for moist air from the humidifier 14 through a port 33 in the core 13. The connection 31 is provided with a side connection 34 which opens into a water passage 35 positioned to register with the water port 36 in the core 13, and this is connected to the humidifier 14 through a tube 37 having fittings 38 and 39 at the ends. The connection 34 also extends to an extra or special fuel passage 40 that is positioned to register with the fuel port 41 of the core 13 and is connected by a tube 42, through a fitting 43 to the special tank 17, the tube 42 extending downwardly to a point spaced from the lower end of the tank.

The passage 32 is connected by a tube 44, with a fitting 45 therein, to the filter 15 through a T 46 with a valve 47 positioned between the T and filter for regulating the volume of air passing from the filter through the valve. The T 46 is also provided with a tube 48 that extends to a chamber 49 in the head 50 of the float chamber of the humidifier 14, and this is connected to the head through a fitting 51.

With the port 32 open, as in the position of idling, dry air is drawn directly through the supercharge air filter and passes directly into the openings 18 and 24 of the flange from which it is drawn into the intake manifold with the fuel mixture. As the port 32 is closed the air in the filter passes in the opposite direction, passing through the tube 48, into the chamber 49 and around the nozzle 52, creating suction in the nozzle which draws water from the tank 16 through the tube 53, and the air and water pass downwardly through the tube 54 with the air passing out of the lower end of the tube 54 bubbling upwardly through the water in the humidifier 14.

A float 55 is provided in the float chamber 56 of the humidifier 14 and the float is provided with a centrally disposed opening 57 which fits over the tube 54 so that the float is free to slide upwardly and downwardly on the tube. The lower end of the float is provided with a yoke 58 which carries a stem 59 that extends upwardly through the tube 54. The upper end of the stem 59 is provided with a valve member 60 that coacts with the lower end of the tube 52, providing a valve to close off the water supply when the water level in the chamber 56 reaches a predetermined point. The air bubbling upward through the water absorbs some of the water and is drawn from the upper end of the humidifier through a tube 61 into the passage 31, the port 33 having been turned to the open position by the throttle valve of the engine. The tube 61 is provided with fittings 62 and 63.

With increased speed of the engine the port 36 is turned to the open position wherein water is drawn through the tube 37 and an extension 70 thereof from the lower part of the float chamber 56 and through the passage 35 into the passage 27 through the connections 34 and 31, and from the passage 27 the water is sprayed into the fuel stream through the members 10.

With the speed of the engine increased still further the port 41 is advanced to the open position whereby fuel from the tank 17 is drawn through the tube 42 and the passage 40 into the passage 27 also through the connections 34 and 31 and from the passage 27 into the fuel stream through the members 10.

The core 13 of the valve member 12 is rotatably mounted in an opening 71 and the large end is provided with a shaft 72 which extends through a packing gland 73 in which packing 74 is provided and the outer end of the shaft 72 is provided with an arm 75 that is pivotally connected to a link 76 through a pin 77. The opposite end of the link 76 is connected by a pin 78 to an arm 79 of the carburetor throttle or butterfly valve 80 and the arm 79 is connected by a member 81 to the accelerator pedal of the vehicle. By this means the auxiliary or special fuel supply and moistening devices are positioned to provide extra fuel and moisture to the fuel stream or streams passing into the intake manifold and are operated in conjunction with the carburetor throttle of the vehicle or by other suitable means whereby the moisture and fuel are supplied in proportion to the speed of the vehicle.

A valve casing 12 is provided with an adjusting screw 82 which retains a core 13 in operative position so that the core will turn freely in the valve casing.

In the design illustrated in Figure 9 a frustroconical device 83 similar to the device 10 is positioned in an opening 84 of a flange 85 for a single barrel carburetor and a tube 86 similar to the tube 19 connects the member 83 to a passage 87 which communicates with a passage 88 in a valve 89 that is provided with a threaded stud 90 that is threaded into a socket 91 of the flange 85.

In this design the passage 88 connects directly with an air filter 92 through a tube 93 which is provided with a regulating valve 94. The valve 94 provides a supercharge valve that may be set or regulated by hand to control the volume of air passing from the filter into the fuel stream. The valve body 89 is also provided with a side connection 95 which is formed with a seat 96 for a needle valve 97 which controls the passage of water from a tank 98 through a tube 99 and a connection 100. The tube 99 is provided with fittings 101 and 102 by which the ends thereof are connected to the valve body and water, respectively.

The valve 97 is provided with a stem 103 having a threaded section 104 thereon which is threaded into the opening 105 of the valve body, whereby as the stem is rotated with the accelerator pedal through a link 106 similar to the link 76 the needle valve will be adjusted. The outer end of the stem 103 is provided with an arm 107 which is connected to the link 106 through a pin 108. The stem 103 passes through a packing gland 109 that is threaded on a boss 110 of the valve body as shown.

In the design shown in Figure 10 a tube 111 similar to the tube 99 is provided with a three way valve 112, one end of which is connected by the tube 111 to the valve body 89, the opposite end to the water tank 98 through a tube 113, and a third port is connected by a tube 114 to a suitable source of fuel supply whereby either water or fuel may be supplied to the fuel stream through the valve body 89.

In order to diminish the possibility of frost in the connection to the intake manifold an opening 115 is provided in the flange 11 which provides an air inlet connection so that air is drawn from the passage through the flange to the air and fuel passage into the manifold to prevent frosting in the connection in winter, or in cold humid climates.

The air passing the lower end of the throttle valve as indicated by the arrow 116 in Figure 6 which draws fuel in through the post 117 in idling causes frost in cold humid winter climates and air entering through the opening 115 raises the temperature of this air sufficiently to diminish frost.

Introducing the air at this point does not affect the function of the carburetor. The supercharged outside air from the humidifier is at a higher temperature than the air passing the butterfly valve, so that it minimizes the temperature drop in the fuel mixture which causes frosting.

The device may therefore be supplied in different designs and installed in different arrangements depending upon the type and characteristics of the engine and the parts may be adjusted to supply dry air for idling, moist air for intermediate speeds, and water and extra fuel for high speeds.

The device is automatically operated with the accelerator or foot pedal of the vehicle as shown, or it may be independently actuated, and the individual elements may be adjusted to compensate for varying conditions under which the device is operating.

It will be understood that other modifications may be made in the design and arrangement of the parts without departing from the spirit of the invention.

What is claimed is:

1. A supplementary liquid or auxiliary fuel charger for internal combustion engines comprising a suction element positioned in the fuel intake passage of the engine, said element having a side connection opening to the atmosphere for added air, means supplying moist air to the said side connection of the suction element, means supplying water to the said side connection of the suction element, means supplying extra fuel to the said side connection of the suction element, and adjusting means regulating the fluids and water injection entering said side connection.

2. In a water atomizing and injecting device for internal combustion engines, the combination which comprises an adaptor plate positioned between the carburetor and intake manifold of the engine, said plate having an opening therethrough, a frustroconical shaped suction element positioned in the opening of said plate, a side connection extended from said frustroconical shaped element, and means supplying mixtures of air, water and fuel to said suction element.

3. In a water atomizing and injecting device for internal combustion engines, the combination which comprises a plate positioned between the carburetor and intake manifold of the engine, said plate having an opening therethrough, a frustroconical shaped suction element positioned in the opening of said plate, a side connection extended from said frustroconical shaped element, a valve member having a plurality of passages therethrough connected to the plate and positioned with the said passages communicating with the side connection of the said suction element, an air filter connected to one of the passages of the valve member, a humidifier connected to another passage of the valve member, a water tank connected to another passage of the valve member through the humidifier, a fuel tank connected to another passage of the valve member, a valve core rotatably mounted in said valve member and having ports therethrough corresponding with the passages of the valve member, said core positioned to intercept said passages through the valve member and with the ports positioned to register respectively with said passages, and means actuating said core to regulate the passage of fluid through said ports.

4. In a water atomizing and injecting device for internal combustion engines, the combination which comprises an adaptor plate positioned between the carburetor and intake manifold of the engine, said plate having an opening therethrough, a frustroconical shaped suction element positioned in the opening of said plate, a side connection extended from said frustroconical shaped element, a valve member having a plurality of passages therethrough carried by the plate and positioned with the said passages communicating with the side connection of the said suction element, an air filter connected to one of the passages of the valve member, a humidifier connected to another passage of the valve member, a water tank connected to another passage of the valve member through the humidifier, a fuel tank connected to another passage of the valve member, a valve core rotatably mounted in said valve member and having ports therethrough corresponding with the passages of the valve member, said core positioned to intercept said passages through the valve member and with the ports positioned to register respectively with said passages, and means actuating said core by the throttle arm of the carburetor of a vehicle in which the engine is installed or independently actuated by means provided therefor for controlling the passage of fluid and air through the said ports.

5. In a water atomizing and injecting device for internal combustion engines, the combination which comprises a plate positioned between the carburetor and intake manifold of the engine, said plate having an opening therethrough, a frustroconical shaped suction element positioned in the opening of said plate, a side connection extended from said frustroconical shaped element, and means supplying mixtures of air, water and fuel to said suction element, and said plate having an opening from the side connection thereof to the leading edge of the opening therethrough.

6. In an auxiliary fuel charging device the combination which comprises a plate positioned between a carburetor and an intake manifold, said plate having a side connection therethrough and provided with an outlet opening from said side connection to the side of the plate adjacent the carburetor, means in said plate for creating suction through the said side connection by the fuel and air mixture passing therethrough, means actuated by the accelerator of a vehicle in which the device is installed for supplying air, water, and fuel to the said side connection of the flange.

7. A mixing valve body having a threaded nipple extended from one side, a plurality of threaded sockets in the opposite side and passages connecting the said threaded sockets to the threaded nipple, said passages extended in a common plane and in substantially parallel relation through the intermediate part of said valve body, and a conical shaped valve member rotatably mounted in the intermediate part of said valve body and intercepting the said parallel passages, said conical shaped valve member having openings therethrough and said openings positioned to progressively register with the parallel passages through the valve body, whereby dry air, moist air, water and added fuel are drawn through the threaded nipple with the nipple extended into an inlet air passage of a carburetor.

8. A mixing valve body having a threaded nipple extended from one side, a plurality of threaded sockets in the opposite side and passages connecting the said threaded sockets to the threaded nipple, said passages extended in a common plane and in substantially parallel relation through the intermediate part of said valve body, and a conical shaped valve member rotatably mounted in the intermediate part of said valve body and intercepting the said parallel passages, said conical shaped valve member having openings therethrough and said openings positioned to progressively register with the parallel passages through the valve body, an adapter plate having a passage therethrough in the outer end of which the said threaded nipple of the valve body is positioned, and a frustro-conical shaped suction element having a supporting flange extended at one side and having a tubular air passage extended through the said flange and opening into the lower part of the element whereby air passing through the adapter creates suction drawing dry air, moist air, water and added fuel into the air through the passages of the said valve body, said supporting flange of the suction element positioned to correspond with the passage through the adapter plate.

9. An adapter plate shaped to be positioned between the flange of a carburetor and the flange of an intake manifold of an engine having an air passage therethrough and having an opening extended from the air passage to one side of the adapter plate and having a threaded socket in the outer end of the opening, a centrally positioned frustro-conical shaped suction element in the air passage of the adapter plate, said element having a supporting flange extending from one side for supporting the element from the end of the opening through the adapter plate, said element also having a tubular air passage extended from the opening in the adapter plate through the flange and opening into the small end of the frustro-conical shaped element, said element having a downwardly extended lip on the side thereof corresponding with the point where the tubular air passage enters the element.

LEONARD R. BESTER.

References Cited in the file of this patent

UNITED STATES PATENTS

| Number | Name | Date |
| --- | --- | --- |
| 1,510,151 | Moore | Sept. 30, 1924 |
| 1,519,483 | Burns | Dec. 16, 1924 |
| 1,545,649 | Fowler | July 14, 1925 |
| 1,578,606 | Leuthesser | Mar. 30, 1926 |
| 1,587,535 | Litchfield | June 8, 1926 |
| 1,974,865 | Goldoft et al. | Sept. 25, 1934 |
| 2,128,154 | Masters | Aug. 23, 1938 |
| 2,138,038 | Mitchell | Nov. 29, 1938 |